(12) United States Patent
Gwon (10) Patent No.: US 11,961,135 B2
(45) Date of Patent: Apr. 16, 2024

(54) BIDDING PROCESS AND PRICE CALCULATION FORMULA IN METHOD OF REQUESTING WASTE COLLECTION SERVICES

(71) Applicant: Ecube Labs Co., LTD., Monterey Park, CA (US)

(72) Inventor: Sunbeom Gwon, Seoul (KR)

(73) Assignee: ECUBE LABS CO., LTD., Monterey Park, CA (US)

( * ) Notice: Subject to any disclaimer, the term of this patent is extended or adjusted under 35 U.S.C. 154(b) by 142 days.

(21) Appl. No.: 17/755,017

(22) PCT Filed: Oct. 21, 2020

(86) PCT No.: PCT/US2020/056558
§ 371 (c)(1),
(2) Date: Apr. 19, 2022

(87) PCT Pub. No.: WO2021/081021
PCT Pub. Date: Apr. 29, 2021

(65) Prior Publication Data
US 2022/0398655 A1    Dec. 15, 2022

Related U.S. Application Data

(60) Provisional application No. 62/923,831, filed on Oct. 21, 2019.

(51) Int. Cl.
*G06Q 30/08* (2012.01)
*G06Q 10/0834* (2023.01)
*G06Q 10/30* (2023.01)

(52) U.S. Cl.
CPC ....... *G06Q 30/08* (2013.01); *G06Q 10/08345* (2013.01); *G06Q 10/30* (2013.01)

(58) Field of Classification Search
USPC ........................................... 705/37
See application file for complete search history.

(56) References Cited

U.S. PATENT DOCUMENTS 7,957,937 B2 *   6/2011   Waitkus, Jr. ........... G06Q 10/08
                                                        702/188
11,790,290 B1 * 10/2023   Kim ..................... G06Q 10/047
                                                        701/411
(Continued)

FOREIGN PATENT DOCUMENTS

JP        3545314 B2    7/2004
WO        2015137997    9/2015
(Continued)

OTHER PUBLICATIONS

International Search Report issued in PCT/US20/56558, dated Jan. 25, 2021.
(Continued)

*Primary Examiner* — Paul S Schwarzenberg
(74) *Attorney, Agent, or Firm* — ICE MILLER LLP (57) ABSTRACT

A method of a pricing scheme and a bidding process for waste collection services comprising: providing a waste management service, determining a price for the waste collection services, providing a bidding process for a hauler to participate in the waste collection services, and selecting a hauler based on the bidding process.

17 Claims, 4 Drawing Sheets

(56) References Cited

U.S. PATENT DOCUMENTS

| | | |
|---|---|---|
| 2001/0056396 A1 | 12/2001 | Goino |
| 2003/0023505 A1 | 1/2003 | Eglen et al. |
| 2004/0199401 A1 | 10/2004 | Wagner et al. |
| 2009/0126473 A1* | 5/2009 | Porat .................. G01F 23/00 340/815.4 |
| 2012/0191558 A1* | 7/2012 | Kilimnick .............. G06Q 30/08 705/26.3 |
| 2014/0214697 A1* | 7/2014 | McSweeney .......... G06Q 10/30 705/308 |
| 2015/0298903 A1* | 10/2015 | Luxford .................. H04Q 9/00 340/870.16 |
| 2016/0035019 A1 | 2/2016 | Rosner et al. |
| 2016/0300297 A1* | 10/2016 | Kekalainen ............. G06F 17/18 |
| 2017/0109704 A1* | 4/2017 | Lettieri .............. G06Q 10/1093 |

FOREIGN PATENT DOCUMENTS

| | | | |
|---|---|---|---|
| WO | WO-2018067360 A1 * | 4/2018 | ......... G06Q 30/0607 |
| WO | 2018206766 | 11/2018 | |

OTHER PUBLICATIONS

Extended European Search Report and Opinion issued in EP 20 88 0065, dated Oct. 5, 2023.

\* cited by examiner

BIDDING PROCESS AND PRICE CALCULATION FORMULA IN METHOD OF REQUESTING WASTE COLLECTION SERVICES

CROSS-REFERENCE TO RELATED PATENT APPLICATIONS

This is a U.S. National Phase Application under 35 U.S.C. § 371 of International Patent Application No. PCT/US2020/056558, filed Oct. 21, 2020, and claims priority to U.S. Provisional Patent Application No. 62/923,831, filed Oct. 21, 2019, which is incorporated by reference in its entirety. The International Application was published on Apr. 29, 2021, as International Publication No. WO 2021/081021 A1.

BACKGROUND OF THE PRESENT DISCLOSURE

Embodiments of the present disclosure relate to waste collection, and more specifically, to a pricing scheme and bidding process for waste collection services. Waste disposal and collection is an important part of waste management. Embodiments of the present disclosure provide for a pricing scheme for waste collection services, and a bidding process for waste collection services.

Many methods and processes currently used in the waste collection industry have not changed much over the last few decades. This is especially true regarding the pricing of services in the waste collection industry. The majority of waste collection companies do not publicly disclose their pricing, and in many cases, the most common, and often only, way for a customer to compare the prices of various companies involves a long and often difficult process.

The process often includes a customer (e.g., a waste generator) searching for multiple haulers providing waste collection services in the customer's area. The customer then has to search for and locate their contact information. The customer then must call or email each service provider to find out the price of their services. This step is usually very slow, cumbersome, and time-consuming, as it can sometimes be hard to reach the haulers and obtain a response. Once the customer has all of the prices, the customer must then compare the prices, and also search for reviews of each hauler to confirm their credibility and dependability. When the customer chooses a particular hauler to proceed with, the customer often has to sign a contract with the particular hauler for a long period of time (e.g., 1-3 years). This long and tedious process does not even guarantee that the customer is receiving the lowest price for a hauler's services.

To address these and other shortcomings of existing methods, the present disclosure provides for a pricing scheme that provides lower prices for waste collection services in a more streamlined way. In some embodiments, the pricing scheme is based on a pricing principle that is dependent on waste fill-level data and waste volume of a dumpster.

SUMMARY OF THE PRESENT DISCLOSURE

According to embodiments of the present disclosure, methods of, systems, and computer program products for pricing and bidding for waste collection services are provided.

A method of a pricing scheme and a bidding process for waste collection services includes: providing a waste management service, determining a price for the waste collection services, providing a bidding process for a hauler to participate in the waste collection services, and selecting a hauler based on the bidding process. The price for the waste collection service may be calculated based on at least one of the following: a service type used by a customer, a waste type, a dumpster size, and a fill-level of the dumpster. The service type used by a customer may include an on-demand collection, wherein the customer may choose to ask for collection of waste as needed and the hauler to bid to provide the collection of waste. Another service type used by the customer may include smart collection, wherein the collection of waste is automatically carried out based on the fill-level of the dumpster. The dumpster's fill level may be detected by, e.g., a fill-level sensor that is configured to be wirelessly (or with wire) connected to a computing system that is further configured to carry out the process as described herein as shown in, e.g., FIGS. 1, 2A, 2B, and 3. The waste type may be selected from at least one of the following: a general waste, an organic waste, an electronic waste, a chemical waste, a recyclable waste, a medical waste, a hazardous waste, a construction waste, and the like.

The pricing may be based at least on a fixed cost and a variable cost. The pricing may be determined by an equation including a default value, a waste volume, a slope and a waste type, wherein the equation is: Price=(Default value+(waste volume×slope))×waste type. The default value may be an amount determined based on a service type, a waste type, and a dumpster size of the customer, wherein the waste volume may be an amount determined by multiplying the dumpster size and a dumpster's fill-level expressed as a percentage, wherein the slope may be an amount determined based on the service type and the dumpster size, and wherein the waste type may be a coefficient dependent on the type of waste being disposed.

The bidding process may include at least two haulers bidding on the waste generator, wherein the bidding process is either independent of price determination or integrated with determining the pricing calculation. The bidding process may include a reverse-auction mechanism, where the price of the waste collection services decreases as the at least two haulers underbid one another in order to win a right to carry out a generator's waste collection request. The reverse auction may determine a starting price at which a starting price of the bidding process can be set by a service provider. The starting price may be set based on a plurality of factors including: 1) a plurality of prices of a particular waste generator's past collections; 2) a starting price based on a starting price used for customers with a similar profile in terms of waste volume and vicinity to a particular waste generator's location, when there is no data on the waste generator's past collections; and 3) a price table prepared by a service provider used to determine the starting price, when (1)-(2) are not available.

After a starting price is set, the at least two waste haulers can engage in a bidding process whereby each of the waste haulers can only bid once rather than multiple times. After the starting price is set at least two waste haulers can engage in a bidding process whereby each of the waste haulers can place multiple bids. After a starting price is set at least two waste haulers can engage in a bidding process whereby each day the haulers have a set time window in which the waste haulers place their bids in order to have a chance to obtain a right to carry out the generator's collection request. The method is carried out using a garbage compactor bin that includes: a main body unit into which a garbage is inserted and a fill-level sensor to detect when the garbage reaches a certain threshold and transmit a signal for waste collection services.

A system for pricing scheme and a bidding process for waste collection services includes: one or more processors or processing units, a system memory. a processor, and a bus that couples various system components including system memory to a processor, wherein the system is located in a garbage compactor bin, and wherein the system is configured to carry out the method that includes: providing a waste management service; determining a price for the waste collection services; providing a bidding process for a hauler to participate in the waste collection services; and selecting a hauler based on the bidding process. The garbage compactor bin may include: a main body unit into which a garbage is inserted; and a fill-level sensor that is configured to determine the amount of garbage in the garbage compactor bin.

DETAILED DESCRIPTION OF THE PRESENT DISCLOSURE

The present disclosure provides a pricing and bidding system for waste collection using a waste fill-level data and waste volume of a dumpster. In some embodiments, the pricing scheme is incorporated into a waste management service, such as the Haulla service by Ecube Labs. Using the pricing scheme, Haulla can determine a price for various waste collection services. In some embodiments, the pricing for waste collection service may be based primarily on four determinants: the service type used by a customer (e.g., a service type within Haulla, such as Smart Collection or On-Demand Collection), the waste type (e.g., general waste, recyclable waste, medical waste, hazardous waste, construction waste, etc.), the dumpster size, and the fill-level of the dumpster. It will be appreciated that other factors may also be used in calculating the pricing.

In some embodiments, the pricing can be modeled by an equation. The pricing can be based on a combination of a fixed cost and a variable cost. Equation 1 is an exemplary equation for calculating the price for waste collection services.

$$\text{Price} = (\text{Default value} + (\text{waste volume} \times \text{slope})) \times \text{waste type} \quad \text{Equation 1}$$

In Equation 1, "default value" is an amount determined based on the service type, waste type, and dumpster size of the customer. "Waste volume" is an amount determined by multiplying the dumpster size and the dumpster's fill-level, expressed as a percentage. For example, if a 3 yard dumpster has a fill level of 80%, the waste volume can be calculated as 3×0.8=2.4. The "slope" is an amount determined based on the service type and the dumpster size. In some embodiments, for roll off dumpsters, such as 10-40 yard dumpsters, since a single truck can usually only transport a single dumpster, both the slope and the default value are set high. In some embodiments, for on-demand collections that do not require dumpsters, the slope can always be set at 7. The "waste type" is a coefficient dependent on the type of waste being disposed. For example, the waste type coefficient of recyclable waste can be set to half of the waste type coefficient of general waste. It will be appreciated that Equation 1 can be modified in a variety of ways, such as by inserting additional variables or coefficients.

Table 1 shows exemplary default values for various combinations of service types, waste types, and dumpster sizes.

TABLE 1

| Service type | Waste type | Dumpster size | Default value |
|---|---|---|---|
| Smart Collection | General waste | 1 yard-8 yard | 13 |
| Smart Collection | Recyclable waste | 1 yard-8 yard | 15 |
| On-Demand Collection | General waste | 1 yard-8 yard | 100 |
| On-Demand Collection | Recyclable waste | 1 yard-8 yard | 100 |
| On-Demand Collection | General waste | 10 yard-40 yard | 150 |
| On-Demand Collection | Recyclable waste | 10 yard-40 yard | 150 |

Table 2 shows exemplary slope values for various service types and dumpster sizes.

TABLE 2

| Service type | Dumpster size | Slope |
|---|---|---|
| Smart Collection | 1 yard-6 yard | 7 |
| On-Demand Collection | 1 yard-6 yard | 7 |
| On-Demand Collection | 10 yard-40 yard | 10 |
| On-Demand Collection | — | 7 |

In some embodiments, the pricing scheme can include a bidding process, whereby at least one hauler participates in a bid to earn the business of a waste generator. This bidding process can work independently of the pricing calculation described above, or it can be integrated with the pricing calculation. In some embodiments, the bidding may be carried out in a reverse-auction style, where the price of waste collection services decreases as haulers underbid one another in order to win the right to carry out a generator's waste collection request.

In some embodiments, in order for the reverse auction to function properly, a starting price at which the bidding is to start can be set. The starting price can be set by the Haulla service. In some embodiments, the starting price can be set based on a number of factors. In some embodiments, the starting price may be set based on the three following factors, in order of priority:

1) the prices of the particular generator's past collections,
2) in the event that there is no data on the generator's past collections, the starting price can be based on the starting price used for customers with a similar profile in terms of waste volume and the vicinity of their location to the particular generator's location,
3) if none of the above are available, a price table prepared by Haulla can be used to determine the starting price. However, it will be appreciated that a variety of other factors can be used instead of or in addition to the above three factors to determine the starting bid price.

Once the starting price is set, the haulers can engage in a bidding process whereby each bidder can only bid once rather than multiple times. It will be appreciated that this method can be designed similarly to those used in public tenders. However, in other embodiments, haulers can place multiple bids. In some embodiments, each day, haulers will have a set time window in which they must place their bids in order to have a chance to obtain the right to carry out the generator's collection request.

It will be appreciated that the above pricing scheme and bidding process can be implemented by a software service, such as the Haulla service by Ecube Labs.

Figure 1:
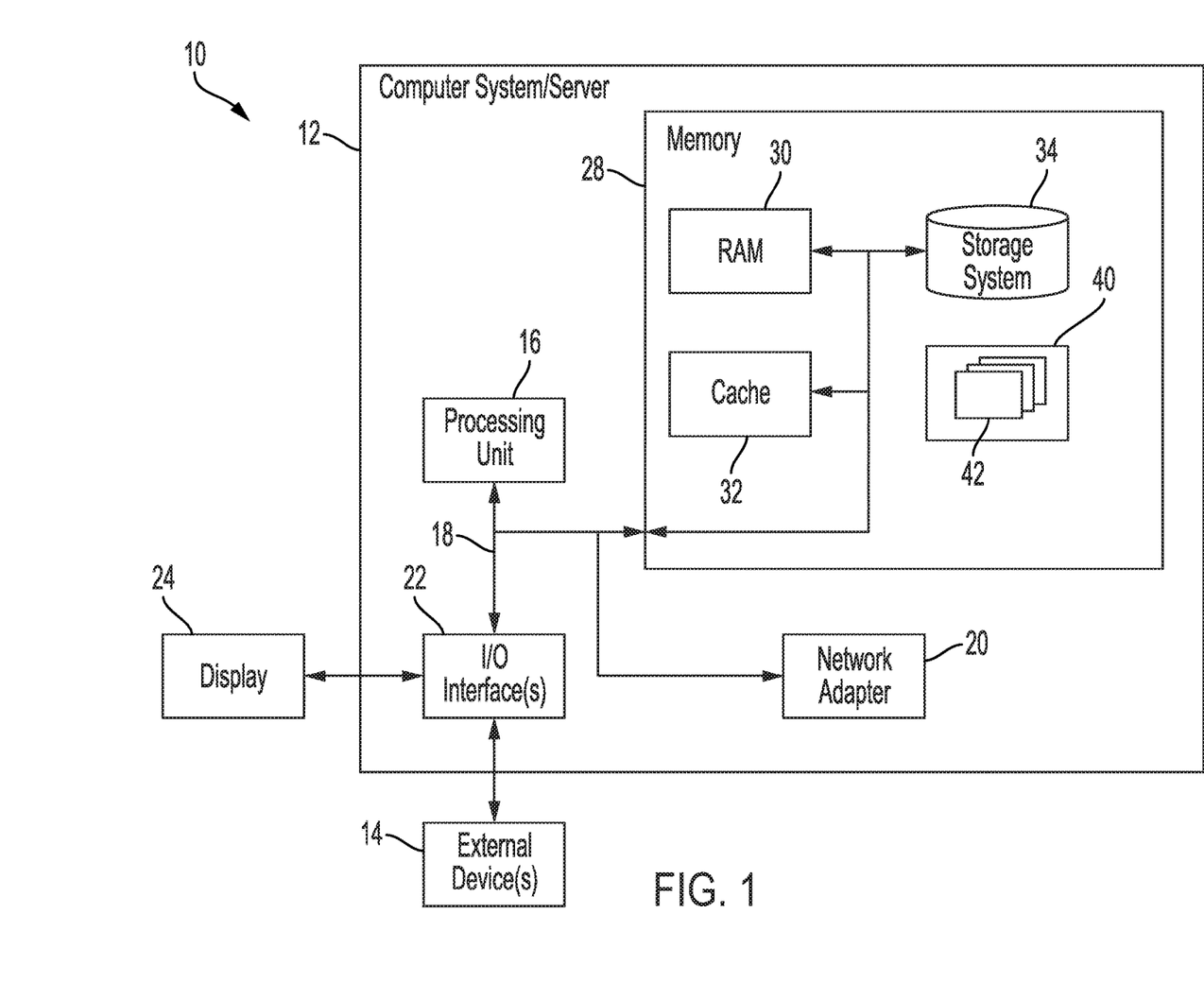
FIG. 1 depicts an example of a system for bidding process and price calculation in accordance with the principles of the present disclosure.

Referring now to FIG. 1, a schematic of an example of a computing node (or system) that is constructed in accordance with the principles of the present disclosure. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it may include both (or either) volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium may include at least one or more of the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein may include an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which may include one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
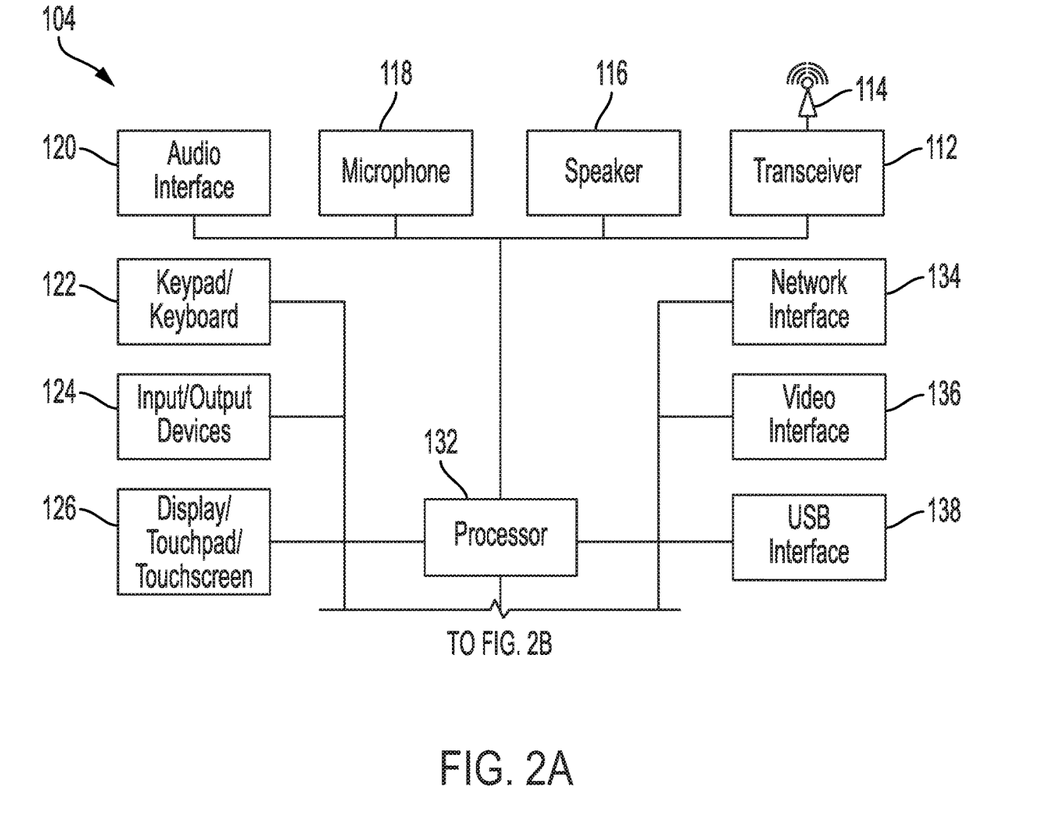
FIGS. 2A and 2B depict an example of a computing process system that may carry out the bidding process and price calculation in accordance with the principles of the present disclosure
Figure 2B:
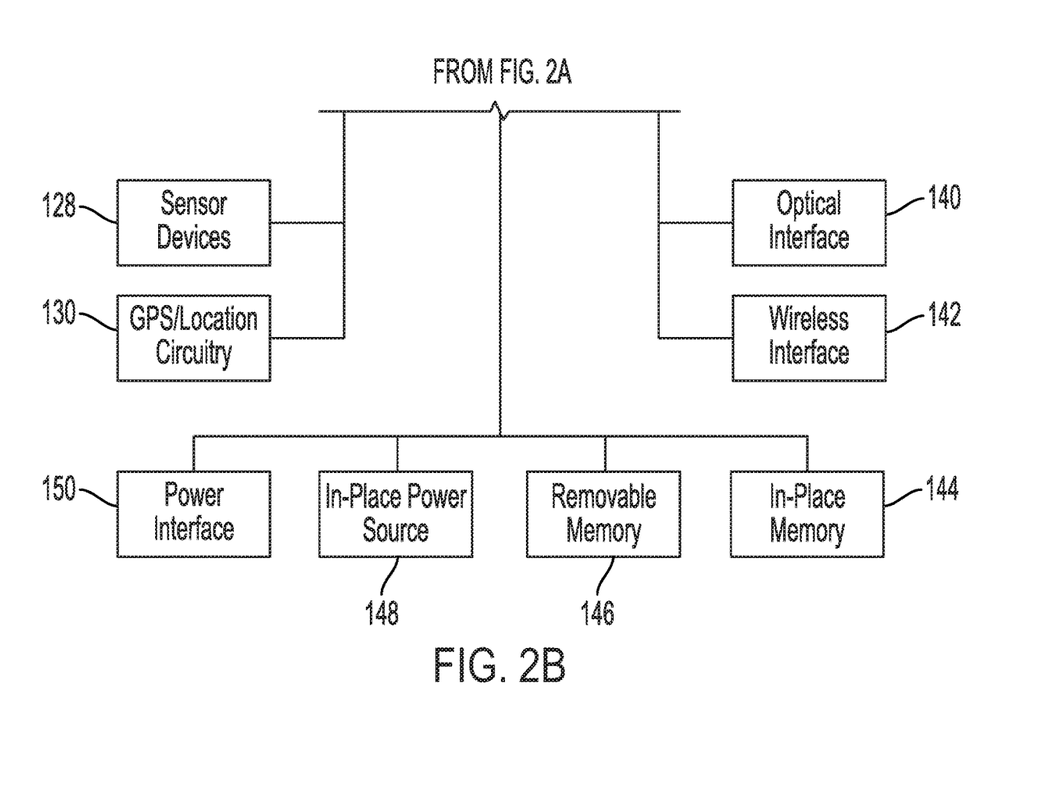

FIGS. 2A and 2B depict a diagram of an example computer/computing (e.g., processing) device 104 that may implement one or more techniques described herein, in whole or at least in part, with respect to one or more of the devices, methods, and/or systems described herein. In FIGS. 2A and 2B, the computing device 104 may include one or more of: a processor 132, a transceiver 112, a transmit/receive element (e.g., antenna) 114, a speaker 116, a microphone 118, an audio interface (e.g., earphone interface and/or audio cable receptacle) 120, a keypad/keyboard 122, one or more input/output devices 124, a display/touchpad/touch screen 126, one or more sensor devices 128, Global Positioning System (GPS)/location circuitry 130, a network interface 134, a video interface 136, a Universal Serial Bus (USB) Interface 138, an optical interface 140, a wireless interface 142, in-place (e.g., non-removable) memory 144, removable memory 146, an in-place (e.g., removable or non-removable) power source 148, and/or a power interface 150 (e.g., power/data cable receptacle). The computing device 104 may include one or more, or any sub-combination, of the aforementioned elements.

The computing device 104 may take the form of a laptop computer, a desktop computer, a computer mainframe, a server, a terminal, a tablet, a smartphone, and/or a cloud-based computing device (e.g., at least partially), and/or the like.

The processor 132 may be a general-purpose processor, a special-purpose processor, a conventional processor, a digital-signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type of integrated circuit (IC), and/or a finite-state machine, and/or the like. The processor 132 may perform signal coding, data processing, power control, sensor control, interface control, video control, audio control, input/output processing, and/or any other functionality that enables the computing device 104 to serve as and/or perform as (e.g., at least partially) one or more of the devices, methods, and/or systems disclosed herein.

The processor 132 may be connected to the transceiver 112, which may be connected to the transmit/receive element 124. The processor 132 and the transceiver 112 may operate as connected separate components (as shown). The processer 132 and the transceiver 112 may be integrated together in an electronic package or chip (not shown).

The transmit/receive element 114 may be configured to transmit signals to, and/or receive signals from, one or more wireless transmit/receive sources (not shown). For example, the transmit/receive element 114 may be an antenna configured to transmit and/or receive RF signals. The transmit/receive element 114 may be an emitter/detector configured to transmit and/or receive IR, UV, or visible light signals, for example. The transmit/receive element 114 may be configured to transmit and/or receive RF and/or light signals. The transmit/receive element 114 may be configured to transmit and/or receive any combination of wireless signals.

Although the transmit/receive element 114 is shown as a single element, the computing device 104 may include any number of transmit/receive elements 114 (e.g., the same as for any of the elements 112-150). The computing device 104 may employ Multiple-Input and Multiple-Output (MIMO) technology. For example, the computing device 104 may include two or more transmit/receive elements 114 for transmitting and/or receiving wireless signals.

The transceiver 112 may be configured to modulate the signals that are to be transmitted by the transmit/receive element 114 and/or to demodulate the signals that are received by the transmit/receive element 114. The transceiver 112 may include multiple transceivers for enabling the computing device 104 to communicate via one or more, or multiple, radio access technologies, such as Universal Terrestrial Radio Access (UTRA), Evolved UTRA (E-UTRA), and/or IEEE 802.11, for example.

The processor 132 may be connected to, may receive user input data from, and/or may send (e.g., as output) user data to: the speaker 116, microphone 118, the keypad/keyboard 122, and/or the display/touchpad/touchscreen 126 (e.g., a liquid crystal display (LCD) display unit or organic light-emitting diode (OLED) display unit, among others). The processor 132 may retrieve information/data from and/or store information/data in, any type of suitable memory, such as the in-place memory 144 and/or the removable memory 146. The in-place memory 144 may include random-access memory (RAM), read-only memory (ROM), a register, cache memory, semiconductor memory devices, and/or a hard disk, and/or any other type of memory storage device.

The removable memory 146 may include a subscriber identity module (SIM) card, a portable hard drive, a memory stick, and/or a secure digital (SD) memory card, and/or the like. The processor 132 may retrieve information/data from, and/or store information/data in, memory that might not be physically located on the computing device 104, such as on a server, the cloud, and/or a home computer (not shown).

One or more of the elements 112-146 may receive power from the in-place power source 148. In-place power source 148 may be configured to distribute and/or control the power to one or more of the elements 112-146 of the computing device 104. The in-place power source 148 may be any suitable device for powering the computing device 104. For example, the in-place power source 148 may include one or more dry cell batteries (e.g., nickel-cadmium (NiCd), nickel-zinc (NiZn), nickel metal hydride (NiMH), lithium-ion (Li-ion), etc.), solar cells, and/or fuel cells, and/or the like.

Power interface 150 may include a receptacle and/or a power adapter (e.g., transformer, regulator, and/or rectifier) that may receive externally sourced power via one or more AC and/or DC power cables, and/or via wireless power transmission. Any power received via power interface 150 may energize one or more of the elements 112-146 of computing device 104, perhaps for example exclusively or in parallel with in-place power source 148. Any power received via power interface 150 may be used to charge in-place power source 148.

The processor 132 may be connected to the GPS/location circuitry 130, which may be configured to provide location information (e.g., longitude and/or latitude) regarding the current location of the computing device 104. The computing device 104 may acquire location information by way of any suitable location-determination technique.

The processor 132 may be connected to the one or more input/output devices 124, which may include one or more software and/or hardware modules that provide additional features, functionality and/or wired and/or wireless connectivity. For example, the one or more input/output devices 124 may include a digital camera (e.g., for photographs and/or video), a hands free headset, a digital music player, a media player, a frequency modulated (FM) radio unit, an Internet browser, and/or a video game player module, and/or the like.

The processor 132 may be connected to the one or more sensor devices 128, which may include one or more software and/or hardware modules that provide additional features, functionality and/or wired and/or wireless connectivity. For example, the one or more sensor devices 128 may include an accelerometer, an e-compass, ToF (time of flight) sensor, and/or a vibration device, and/or the like.

The processor 132 may be connected to the network interface 134, which may include one or more software and/or hardware modules that provide additional features, functionality and/or wireless and/or wired connectivity. For example, the network interface 134 may include a Network Interface Controller (NIC) module, a Local Area Network (LAN) module, an Ethernet module, a Physical Network Interface (PNI) module, and/or an IEEE 802 module, and/or the like.

The processor 132 may be connected to the video interface 136, which may include one or more software and/or hardware modules that provide additional features, functionality and/or wired and/or wireless connectivity. For example, the video interface 136 may include a High-Definition Multimedia Interface (HDMI) module, a Digital Visual Interface (DVI) module, a Super Video Graphics Array (SVGA) module, and/or a Video Graphics Array (VGA) module, and/or the like.

The processor 132 may be connected to the USB interface 138, which may include one or more software and/or hardware modules that provide additional features, functionality and/or wired and/or wireless connectivity. For example, the USB interface 138 may include a universal serial bus (USB) port, and/or the like.

The processor 132 may be connected to the optical interface 140, which may include one or more software and/or hardware modules that provide additional features, functionality and/or wired and/or wireless connectivity. For example, the optical interface 140 may include a read/write Compact Disc module, a read/write Digital Versatile Disc (DVD) module, and/or a read/write Blu-ray™ disc module, and/or the like.

The processor 132 may be connected to the wireless interface 142, which may include one or more software and/or hardware modules that provide additional features, functionality and/or wireless connectivity. For example, the wireless interface 142 may include a Bluetooth® module, an Ultra-Wideband (UWB) module, a ZigBee module, and/or a Wi-Fi (IEEE 802.11) module, and/or the like.

Figure 3:
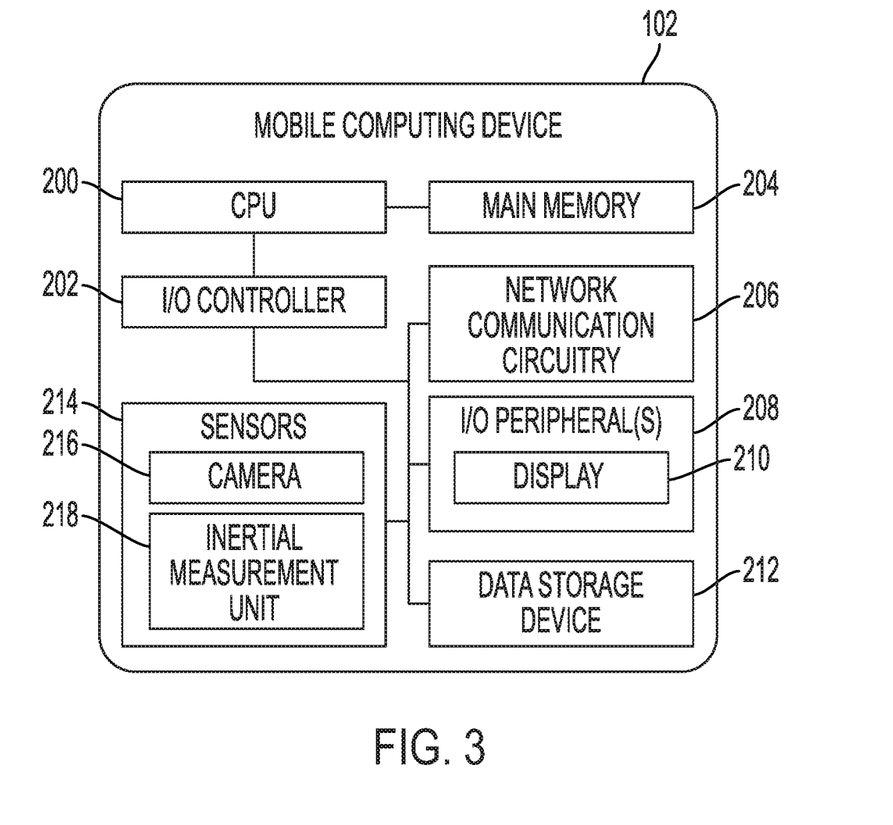
FIG. 3 depicts an example of a computing device that may carry out the bidding process and price calculation in accordance with the principles of the present disclosure.

Referring now to FIG. 3, the illustrative mobile computing device 102 that may be used in carrying out the methods hereunder and in conjunction with the system as shown in, e.g., FIGS. 1, 2A, and 2B. The mobile computing device 102 may include a central processing unit (CPU) 200, an input/output (I/O) controller 202, a memory 204, network communication circuitry 206, one or more I/O peripherals 208, a data storage device 212, and/or various sensors 214. In some scenarios, there may be additional, fewer, and/or alternative components to those of the illustrative mobile computing device 102, such as a graphics processing unit (GPU). In some scenarios, one or more components may be combined on a single system-on-a-chip (SoC) on a single integrated circuit (IC). In some scenarios, the type of components of the respective mobile computing device 102 may be predicated upon the type and/or intended use of the respective mobile computing device 102.

The illustrative mobile computing device 102 may include an application. The application of the mobile computing device 102 is executed by mobile computing device 102 to carry out the functions allocated to mobile computing device 102 according to the present disclosure. The application may be embodied as any combination of hardware, firmware, software, and/or circuitry usable to perform the functions described herein.

The CPU 200, or processor, may be embodied as any combination of hardware and/or circuitry capable of processing data. In some scenarios, the mobile computing device 102 may include more than one CPU 200. Perhaps depending on the scenario, the CPU 200 may include one processing core (not shown), such as in a single-core processor architecture, or multiple processing cores, such as in a multi-core processor architecture. Irrespective of the number of processing cores and/or CPUs 200, the CPU 200 is capable of reading and/or executing program instructions. In some scenarios, the CPU 200 may include cache memory (not shown) that may be integrated directly with the CPU 200 or placed on a separate chip with a separate interconnect to the CPU 200. In some scenarios, pipeline logic may be used to perform software and/or hardware operations (e.g., network traffic processing operations), rather than commands issued to/from the CPU 200.

The I/O controller 202, or I/O interface, may be embodied as any type of computer hardware and/or combination of circuitry capable of interfacing between input/output devices and/or the mobile computing device 102. Illustratively, the I/O controller 202 may be configured to receive input/output requests from the CPU 200, and/or send control signals to the respective input/output devices, thereby managing the data flow to/from the mobile computing device 102.

The memory 204 may be embodied as any type of computer hardware and/or combination of circuitry capable of holding data and/or instructions for processing. Such memory 204 may be referred to as main or primary memory. In some scenarios, one or more components of the mobile computing device 102 may have direct access to memory, such that certain data may be stored via direct memory access (DMA) independently of the CPU 200.

The network communication circuitry 206 may be embodied as any type of computer hardware and/or combination of circuitry capable of managing network interfacing communications (e.g., messages, datagrams, packets, etc.) via wireless and/or wired communication modes. In some scenarios, the network communication circuitry 206 may include a network interface controller (NIC) capable of being configured to connect the mobile computing device 102 to a computer network, as well as other devices, perhaps for example depending on the scenario.

The one or more I/O peripherals 208 may be embodied as any auxiliary device configured to connect to and/or communicate with the mobile computing device 102. For example, the I/O peripherals 208 may include, but are not limited to, a mouse, a keyboard, a monitor, a touchscreen, a printer, a scanner, a microphone, a speaker, etc. Some I/O devices may be capable of one function (e.g., input or output), or both functions (e.g., input and/or output). The illustrative I/O peripherals 208 includes a display, which may be embodied as a touchscreen display capable of receiving user input via touch (e.g., one or more fingers, a stylus, etc.).

In some scenarios, the I/O peripherals 208 may be connected to the mobile computing device 102 via a cable (e.g., a ribbon cable, a wire, a universal serial bus (USB) cable, a high-definition multimedia interface (HDMI) cable, etc.) of the mobile computing device 102. In some scenarios, the cable may be connected to a corresponding port (not shown) of the mobile computing device 102 for which the communications made there between can be managed by the I/O controller 202. In some scenarios, the I/O peripherals 208 may be connected to the mobile computing device 102 via a wireless mode of communication (e.g., Bluetooth®, Wi-Fi®, etc.) which can be managed by the network communication circuitry 206.

The data storage device 212 may be embodied as any type of computer hardware capable of the non-volatile storage of data (e.g., semiconductor storage media, magnetic storage media, optical storage media, etc.). Such data storage devices 212 are commonly referred to as auxiliary and/or secondary storage, and/or may be used to store a large amount of data relative to the memory 204 described above.

The illustrative sensors 214 include a camera sensor 216 and/or an inertial measurement unit (IMU) sensor 218. In some scenarios, the sensors 214 may include one or more additional sensors 214. The camera sensor 216 may be embodied as an type of image sensor (e.g., complementary metal-oxide-semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, and/or any other image sensor technology that can generate digital image frames.

The IMU sensor 218 may include one or more software and/or hardware gyroscopes to measure the orientation of the mobile computing device 102 (e.g., a 3-axis gyroscope), accelerometers to measure proper acceleration of the mobile computing device 102 (e.g., a 3-axis accelerometer), magnetometers to measure the direction of the Earth's magnetic field relative to the mobile computing device 102 (e.g., a 3-axis magnetometer), and/or any other type of inertial motion measurement software/hardware usable to perform the functions described herein (e.g., measure motion along three perpendicular linear axes and/or the rotation around, one or more, or each, of the three perpendicular linear axes).

The network 102 may be implemented as any type of wired and/or wireless network, including a local area network (LAN), a wide area network (WAN), a global network (the Internet), etc. Accordingly, the network 102 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, computer devices, storage devices, etc.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. A computer-implemented method of waste collection from a dumpster having a main body into which garbage is inserted and a fill-level sensor that determines an amount of garbage in the dumpster and transmits a signal when the amount of garbage reaches a threshold, the method comprising:
    receiving, by a computer, a fill-level of the dumpster;
    calculating, by the computer, a waste volume of the dumpster by multiplying a size of the dumpster and the fill-level of the dumpster;
    determining, by the computer, a waste type of the garbage in the dumpster;
    determining, by the computer, a slope based on the size of the dumpster;
    determining, by the computer, a starting price for the waste collection based on at least one of the waste volume, the waste type and the slope; and
    providing, by the computer, a process for a hauler truck to carry out the waste collection, the process including
        transmitting, by the computer, a signal containing the starting price to one or more computing devices, including a computing device of a hauler,
        receiving, by the computer, a signal containing a price from said computing device,
        selecting, by the computer, said price, and
        transmitting a collection request to said computing device to carry out the waste collection.

2. The method of claim 1, wherein the starting price is calculated based on a service type.

3. The method of claim 2, wherein the service type comprises an on-demand collection, wherein the waste collection is carried out as needed.

4. The method of claim 2, wherein the service type comprises a smart-collection, wherein the waste collection is carried out based on the fill-level of the dumpster.

5. The method of claim 2, wherein the waste type is selected from at least one of a general waste, a recyclable waste, a medical waste, a hazardous waste, and a construction waste.

6. The method of claim 1, wherein the starting price is based at least on one of a fixed cost and a variable cost.

7. The method of claim 1, wherein the starting price is determined based on the waste type multiplied by a sum of a default value and a product of the waste volume and the slope: Price=(Default value+(waste volume×slope))×waste type.

8. The method of claim 7, wherein the default value is an amount determined based on a service type, the waste type, and the dumpster size, wherein the slope is an amount determined based on the service type and the size of the dumpster, and wherein the waste type is a coefficient dependent on the type of waste being disposed.

9. The method of claim 1, wherein the process comprises transmitting a signal to at least two computing devices of haulers.

10. The method of claim 9, wherein the process comprises a reverse-auction mechanism, where a signal containing a second price is received, by the computer, from a computing device of another hauler, the second price being lower than the price.

11. The method of claim 1, wherein the starting price is based on a plurality of factors comprising:
    1) prices of past collections;
    2) prices with a similar profile in terms of waste volume and vicinity to a particular location;
    3) a price table when (1)-(2) are not available.

12. The method of claim 1, wherein, after the starting price is determined, the computer receives only a single signal from each of at least two computing devices of haulers.

13. The method of claim 1, wherein, after the starting price is determined, the computer receives multiple signals from each of at least two computing devices of haulers.

14. The method of claim 1, wherein, after the starting price is determined, a time window is set during which signals are receivable by the computer from each of at least two computing devices of haulers.

15. The method of claim 1, wherein the computer is located in the dumpster and configured to carry out the method based on the fill-level.

16. A system for waste collection from a garbage compactor bin, the system comprising:
    a system memory;
    a processor; and
    a bus that couples the system memory to the processor,
    wherein the system is located in the garbage compactor bin, and
    wherein the system memory comprises computer executable instructions that, when executed by the processor, carry out:
        receiving, by the processor, a fill-level of the garbage compactor bin;

calculating, by the processor, a waste volume of the garbage compactor bin by multiplying a size of the bind and a fill-level of the garbage compactor bin;

determining, by the processor, a waste type of garbage in the garbage compactor bin;

determining, by the processor, a slope based on the size of the garbage compactor bin;

determining, by the processor, a starting price for the waste collection based on at least one of the waste volume, the waste type and the slope; and providing, by the processor, a process for a hauler truck to carry out the waste collection, the process including transmitting, by the system, a signal containing the starting price to one or more computing devices, including a computing device of a hauler, receiving, by the system, a signal containing a price from said computing device, selecting, by the processor, said price, and, transmitting a collection request to said computing device to carry out the waste collection.

17. The system of claim 16, wherein the garbage compactor bin comprises:

a main body unit into which garbage is inserted; and a sensor to signal a need for waste collection, wherein the need is based on a fill-level of the garbage compactor bin.

* * * * *